United States Patent [19]
Iida et al.

[11] Patent Number: 5,590,117
[45] Date of Patent: Dec. 31, 1996

[54] NODE INFORMATION COLLECTING METHOD IN A RING SYSTEM

[75] Inventors: Shuichi Iida, Tokyo; Masayuki Oyama, Miyagi, both of Japan

[73] Assignee: NEC Corporation, Tokyo, Japan

[21] Appl. No.: 413,102

[22] Filed: Mar. 29, 1995

[30] Foreign Application Priority Data

Mar. 29, 1994 [JP] Japan .................................. 6-059524

[51] Int. Cl.⁶ ........................................................ H04J 3/14
[52] U.S. Cl. ........................... 370/248; 370/249; 370/245
[58] Field of Search ............................ 370/13, 14, 16.1, 370/85.5, 85.12, 85.15

[56] References Cited

U.S. PATENT DOCUMENTS

| | | | |
|---|---|---|---|
| 5,285,448 | 2/1994 | Nakayama et al. | 370/85.15 |
| 5,412,652 | 5/1995 | Lu | 370/85.12 |
| 5,442,620 | 8/1995 | Kremer | 370/16.1 |
| 5,461,608 | 10/1995 | Yoshiyama | 370/16.1 |

FOREIGN PATENT DOCUMENTS 63-246946  10/1988  Japan ............................. H04L 11/00

*Primary Examiner*—Douglas W. Olms
*Assistant Examiner*—Russell W. Blum
*Attorney, Agent, or Firm*—Sughrue, Mion, Zinn, Macpeak & Seas

[57] ABSTRACT

In a ring network system comprising a plurality of nodes, each node is provided with a node information table which is logically divided into node areas each corresponding to a single node within the ring network. Each node collects node information stored in the node information tables of the two adjacent nodes by regularly accessing the node information tables of those nodes, and updates the contents of its own node information table. As a result of the above information collecting operation that is performed by each node, all the node information can be stored in the node information table of each node.

12 Claims, 7 Drawing Sheets

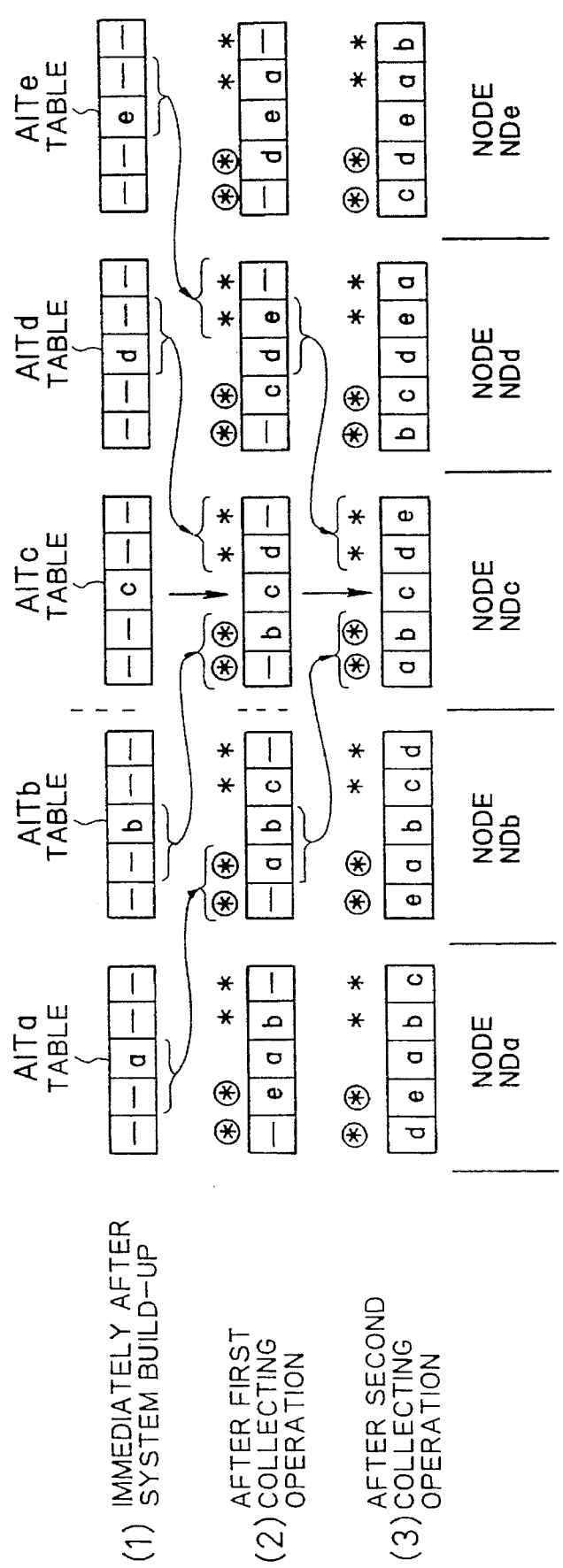

FLAME FORMAT OF DEMAND SIGNAL

FLAME FORMAT OF RESPONSE SIGNAL

NODE INFORMATION COLLECTING METHOD IN A RING SYSTEM

BACKGROUND OF THE INVENTION

1. Field of the Invention

The present invention relates to a network in which a plurality of nodes are interconnected in a ring-like manner and, more specifically, to a method and a system of collecting information indicating operation states of the respective nodes.

2. Description of the Prior Art

With the increase of the scale of ring networks in recent years, countermeasures against network faults are increasingly becoming an important theme. The network faults are classified into node faults and transmission line faults. While the transmission line faults are now very rare by virtue of the introduction of optical transmission lines, the node faults occupy a large proportion of the network faults. Particularly in a large-scale ring network having a large number of nodes, since the probability of occurrences of node faults is accordingly high, it is important to quickly identify a node of fault occurrence and effect a proper measure.

An example of a fault detecting method in a ring network is disclosed in Japanese Patent Application Laid-open No. Sho 63-246946, and will be explained below. Referring to FIG. 1, in a ring system in which a supervisory node SN and ordinary nodes $N_1$–$N_5$ are interconnected to form a loop, a communication between nodes is performed by circulating a data frame 10 in a direction indicated by arrows. The data frame 10 includes a destination address DA, a source address SA, a use indication B/I indicating whether the data frame 10 is in use or not, and a supervisory indication bit M.

When a certain node attempts to use a data frame 10 for an internode communication, it sends the data frame 10 to a ring transmission line after setting its use indication B/I and resetting its supervisory indication M. Receiving the data frame 10, which is in use, the supervisory node SN sends it to the ring transmission line after setting the supervisory indication M. When the data frame 10 is received by the destination node and then sent to the ring transmission line, at least the supervisory indication M is reset at that time. If the data frame 10 is not received by any node, it is again received by the supervisory node SN with both of its use indication B/I and supervisory indication M in a set state. Therefore, the supervisory node SN can identify a node of fault occurrence by analyzing the destination address and the source address of the data frame 10 whose use indication B/I and supervisory indication M are both in a set state.

However, in the above ring network system, since a data frame is circulated through the ring network only in a single direction to obtain fault information, a large-scale network in which a large number of nodes are interconnected requires long time to collect fault information. Further, since a data frame circulates only in a single direction, when a fault of disabling transmission occurs somewhere in the ring network, it is impossible to collect fault information of all the nodes existing downstream of the location of fault occurrence, which is a serious problem in dealing with network faults.

SUMMARY OF THE INVENTION

An object of the present invention is to provide an information collecting method which can quickly collect information of all the nodes that constitutes a ring network system.

Another object of the invention is to provide an information collecting method which can quickly identify a node of fault occurrence in a ring network system.

A further object of the invention is to provide a highly reliable ring network system which can quickly identify a node of fault occurrence.

In a ring network system according to the present invention, each node is provided with a node information table which can store information of all the nodes of the ring network at respective prescribed memory locations. In other words, the node information table is logically divided into node ares each corresponding to a single node within the ring network. Each node collects node information stored in the node information tables of-the two adjacent nodes by regularly accessing the node information tables of those nodes, and updates the contents of its own node information table. As a result of the above information collecting operation that is performed by each node, all the node information can be stored in the node information table of each node.

More specifically, in a node information collecting method according to the invention, self-node information in each the node itself is stored in the node information table at predetermined time intervals, and access to two nodes clockwise and counterclockwise adjacent to each the node is made to collect node information retained in the node information tables of the two adjacent nodes at the predetermined time intervals so that each the node stores node information of all the nodes.

The access to the adjacent nodes is preferably performed using a demand signal and a response signal. First, the demand signal is transmitted from each the node to the two adjacent nodes for requesting the node information stored in the two adjacent nodes. Receiving two response signals from the two adjacent nodes, respectively, the two response signals including the node information retained in the two adjacent nodes, respectively, each the node stores the node information included in the two response signals into the node information table.

BRIEF DESCRIPTION OF THE DRAWINGS

FIG. 6 is a schematic diagram showing how contents of an alarm information table vary, to illustrate an operation of the embodiment;

DESCRIPTION OF THE PREFERRED EMBODIMENT

Figure 1:
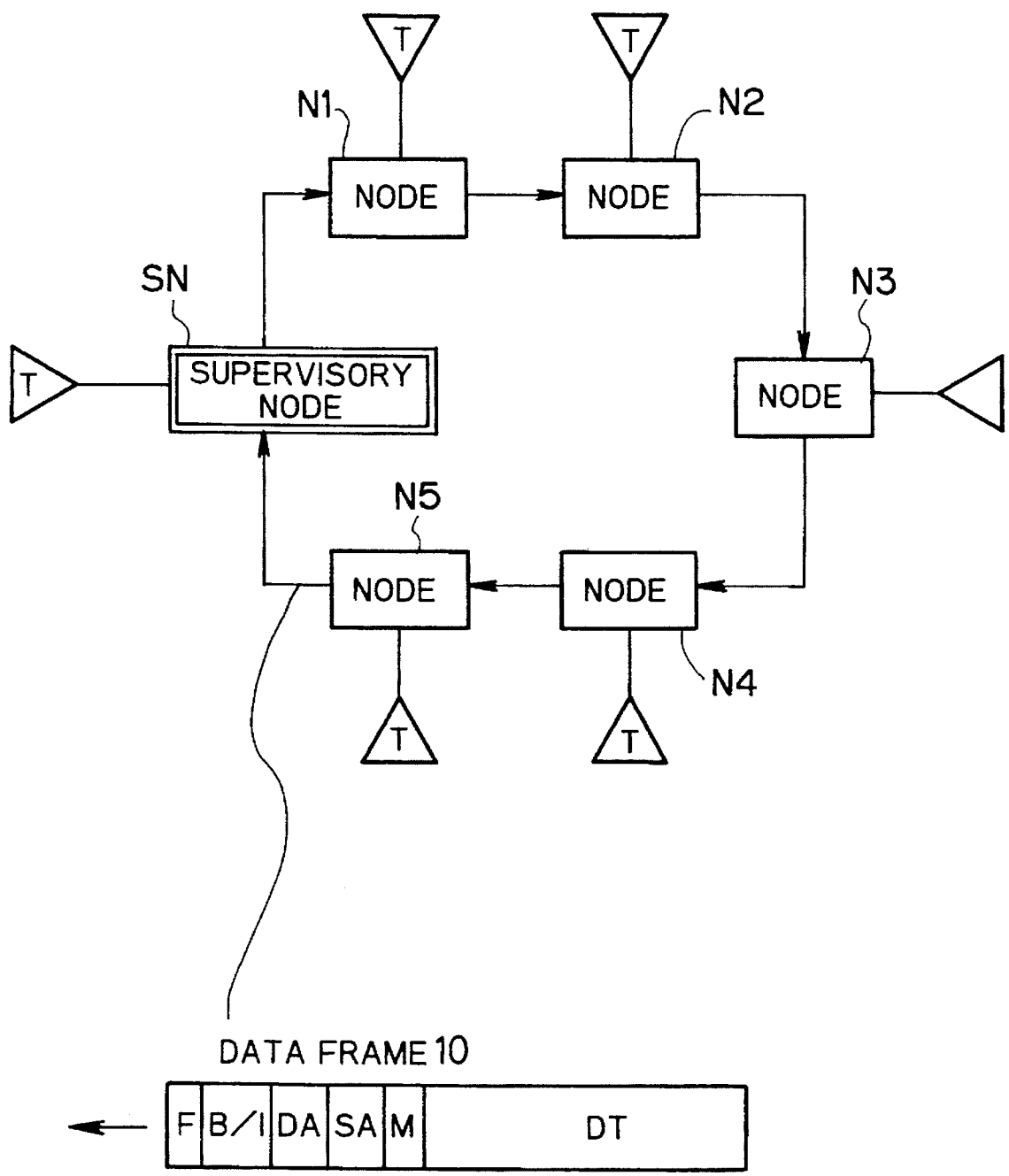
FIG. 1 is a schematic diagram showing a configuration of a conventional ring network system.
Figure 2:
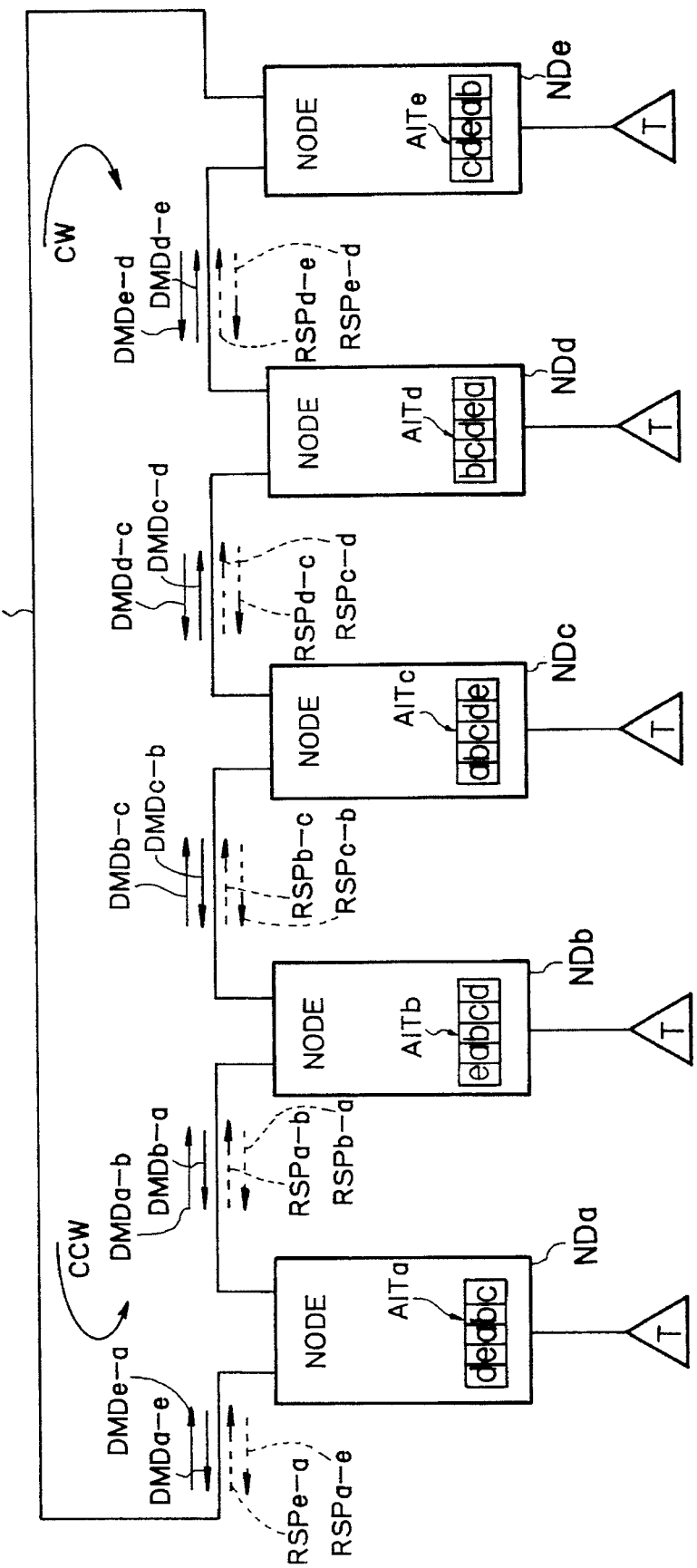
FIG. 2 is a schematic diagram showing a configuration of a ring network system according to an embodiment of the present invention.

For simplicity, the following description will be directed to a ring network system in which five nodes NDa–NDe are interconnected in a ring-like manner via transmission lines, as shown in FIG. 2. The nodes NDa–NDe are provided with respective alarm information tables AITa–AITe, each of which stores alarm information of all the nodes NDa–NDe of the ring network and is always updated at regular time intervals. As described later, the alarm information table AIT of each node is updated such that each node transmits a demand signal DMD to the adjacent nodes and receives a response signal RSP from those nodes. The demand signal DMD is a signal that requests the adjacent nodes to transmit alarm information stored in their alarm information tables AIT. The response signal RSP is a data signal carrying alarm information that is transmitted in response to the demand signal DMD.

Figure 3:
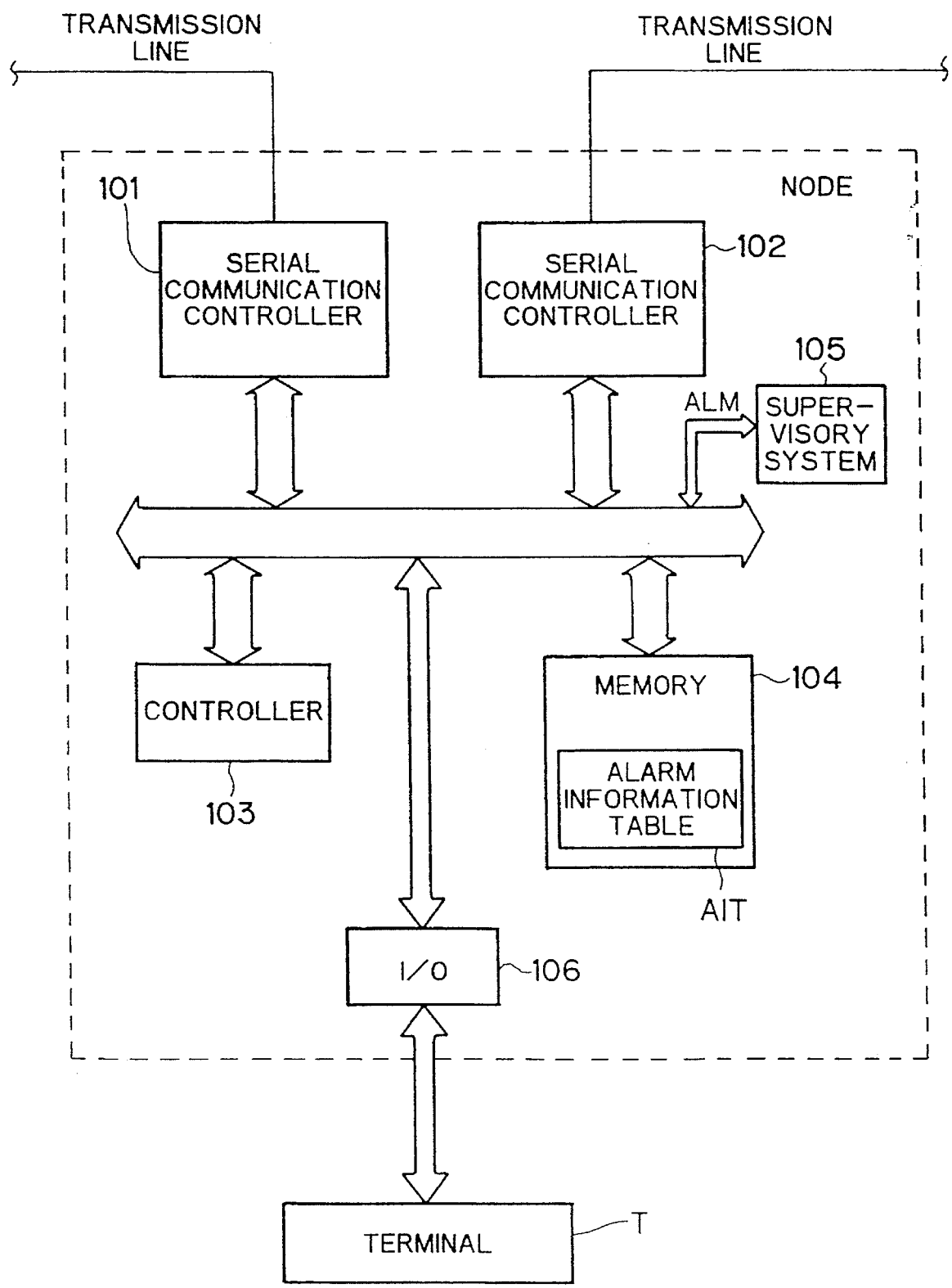
FIG. 3 is a block diagram schematically showing a configuration of a node in the embodiment.

As illustrated in FIG. 3, each node is provided with a serial communication controllers 101 and 102 that are connected to the respective transmission lines. The communication operation of the node is controlled by a controller 103. The alarm information table AIT is included in a memory 104, and stores alarm information ALM that is output from a supervisory system 105 at a prescribed address at predetermined time intervals. When a certain fault occurs in the node, the supervisory system 105, which is known well, outputs alarm information ALM indicating the fault occurrence. A terminal T is connected to the node via an I/O interface 106.

According to instructions from the controller 103, demand signals DMD are sent from the serial communication controllers 101 and 102 to the respective adjacent nodes at predetermined time intervals. Upon reception of response signals RSP from the adjacent nodes in response to the demand signals DMD, the controller 103 write alarm information of the received response signals RSP to the alarm information table AIT at respective prescribed addresses.

Figure 4:
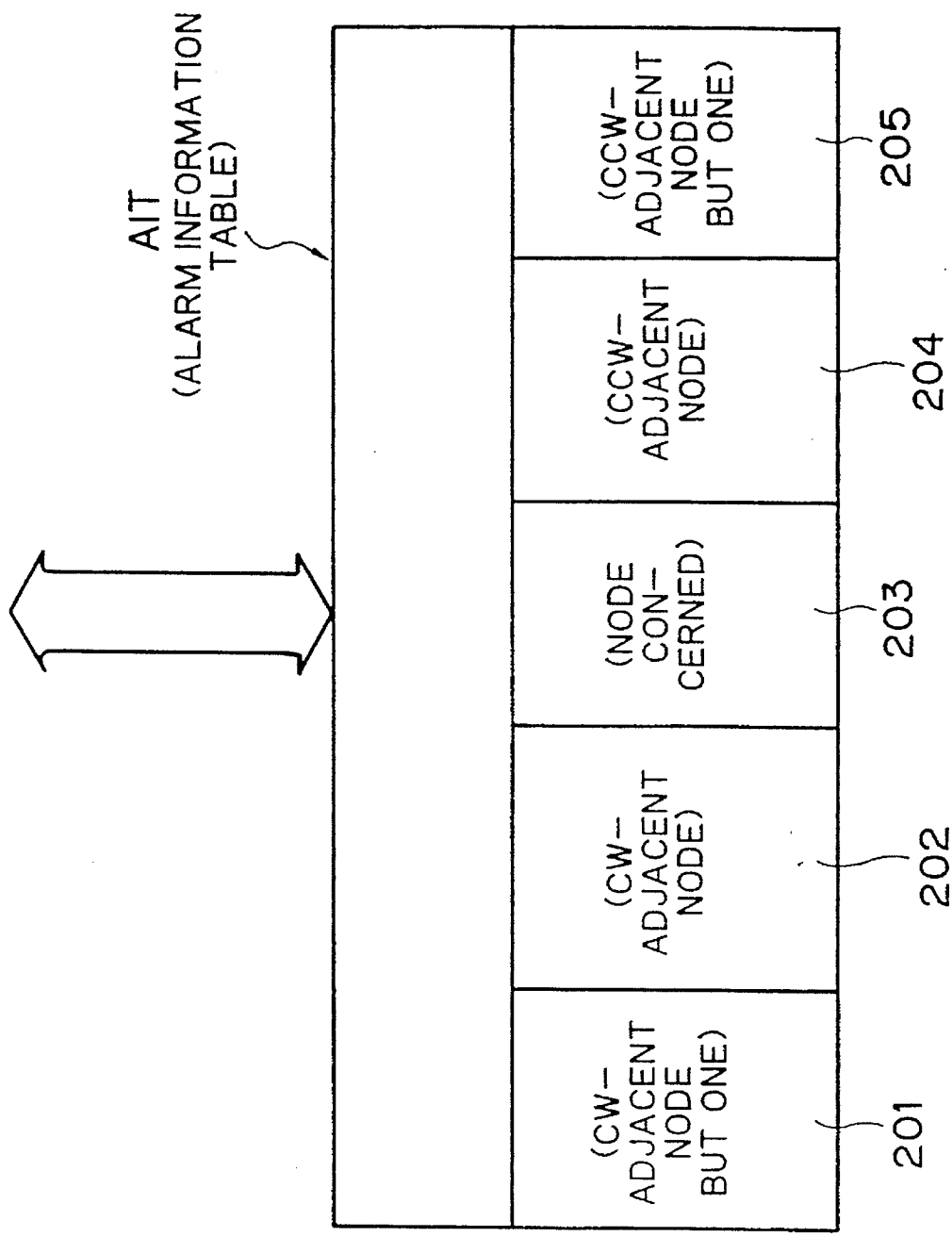
FIG. 4 is a schematic diagram showing a configuration of an alarm information table in the embodiment.

FIG. 4 shows an area configuration of the alarm information table AIT. In this embodiment, since the five nodes NDa–NDe are interconnected in a ring-like manner (see FIG. 2), addresses of five divided areas 201–205 of the AIT that correspond to the respective nodes are predetermined. The central area 203 corresponds to the node to which the alarm information table AIT concerned belongs. The areas 202 and 204 adjacent to the central area 203 correspond to the nodes adjacent to the node concerned. More specifically, the area 202 corresponds to the node that is adjacent to the node concerned in the clockwise direction CW, and the area 204 corresponds to the node that is adjacent to the node concerned in the counterclockwise direction CCW. The area 201 corresponds to the node that is adjacent but one to the node concerned in the clockwise direction CW, and the area 205 corresponds to the node that is adjacent but one to the node concerned in the counterclockwise direction CCW.

For example, in the case of the node NDc (see FIG. 2), the alarm information ALMa–ALMe of the nodes NDa–NDe are stored in the areas 201–205 of the alarm information table AITc, respectively. In the case of the node NDa, the alarm information ALMd, ALMe, ALMa, ALMb and ALMc of the nodes NDd, NDe, NDa, NDb and NDc are stored in the areas 201–205 of the alarm information table AITa, respectively. The same thing applies to the alarm information tables of the other nodes.

Basic Operation

Figure 5:
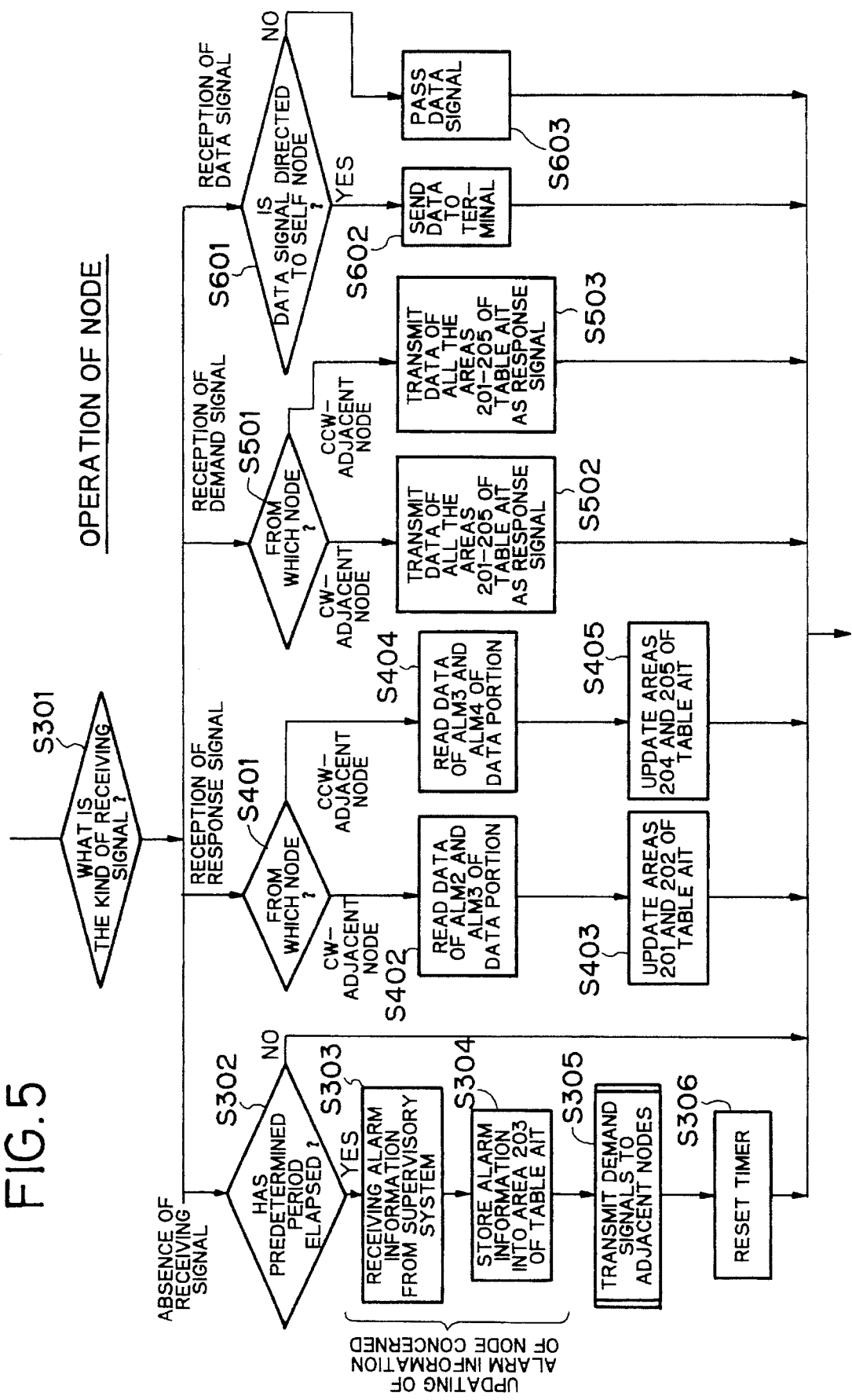
FIG. 5 is a flowchart showing, by way of example, an operation of a node NDc in the embodiment.

A description will be made of the basic operation of the node in this embodiment. FIG. 5 is a flowchart showing a communication operation of an arbitrary node. First, a judgment is made on the kind of a signal received from the transmission line (S301). Operations described below are performed for the respective cases of a demand signal DMD, a response signal RSP, a data signal, and absence of a receiving signal.

Figure 7A:
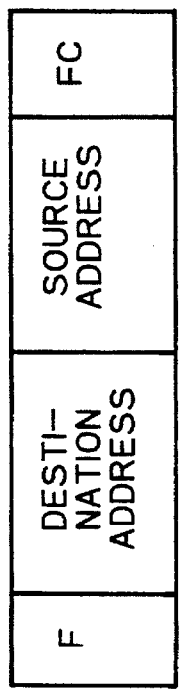
FIG. 7(A) schematically shows a frame format of a demand signal in the embodiment.
Figure 7B:
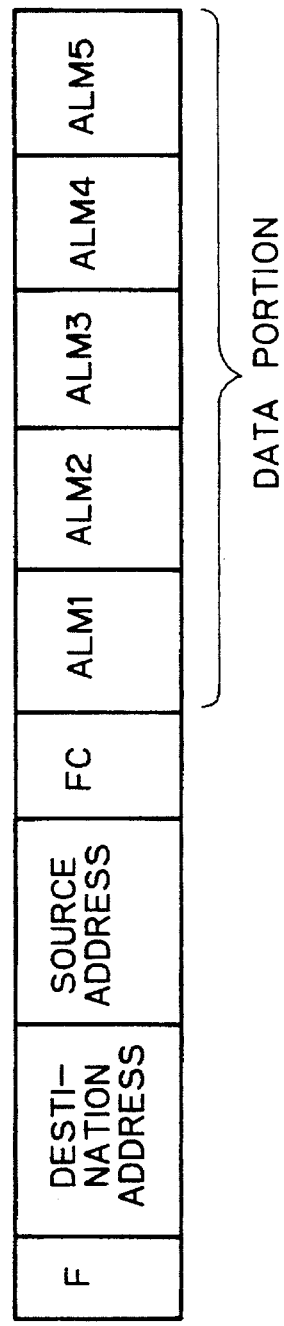
FIG. 7(B) schematically shows a frame format of a response signal in the embodiment.

It should be noted that frame formats of the demand signal DMD and the response signal RSP are shown in FIGS. 7(A) and 7(B), respectively. Discrimination among the demand signal DMD, response signal RSP and data signal is made based on a frame control bit "FC" that follows a source address "SA" in each frame format. The data portion of the response signal RSP is comprised of sections ALM1–ALM5 corresponding to the respective areas 201–205 of the alarm information table AIT of each node.

When no receiving signal is present, it is judged whether a predetermined time period (several milliseconds) has elapsed which determines the transmission interval of the demand signal DMD (S302). If the time interval equal to the transmission interval has elapsed (Yes in step S302), the controller 103 of the node reads alarm information ALM at that time from the supervisory system 105 (S303), and stores it into the central area 203 of the alarm information table AIT (S304). Then, the controller 103 sends demand signals DMD to the node that is adjacent to the node concerned in the CW direction and the node that is adjacent to the node concerned in the CCW direction while controlling the serial communication controllers 101 and 102 (S305). Then, a timer is reset to restart its counting operation for the transmission interval (S306). The alarm information of the node is not updated and no demand signals DMD are transmitted (No in S302) until the time equal to the transmission interval has elapsed.

When a response signal RSP is received in response to the demand signal DMD, it is judged, based on the destination address of the response signal RSP, which sent the response signal RSP, the CW-adjacent node or the CCW-adjacent node (S401). If the response signal RSP was sent from the adjacent node in the CW direction, data (alarm information) of the sections ALM2 and ALM3 in the data portion of the response signal RSP are read (S402) and substituted for the data of the areas 201 and 202 of the alarm information table AIT (S403). Similarly, if the response signal RSP was sent from the adjacent node in the CCW direction, data (alarm information) of the sections ALM3 and ALM4 in the data portion of the response signal RSP are read (S404) and substituted for the data of the areas 204 and 205 of the alarm information table AIT (S405).

When a demand signal DMD is received, it is judged, based on the destination address, from which of the adjacent nodes in the CW and CCW directions the demand signal DMD was sent (S501). If the demand signal DMD was received from the adjacent node in the CW direction, a response signal RSP is generated in which data of all the areas 201–205 of the alarm information table AIT are transferred to the data portion ALM1–ALM5 and transmitted to the adjacent node in the CW direction (S502). If the demand signal DMD was received from the adjacent node in the CCW direction, a response signal RSP is generated in which data of all the areas 201–205 of the alarm information table AIT are transferred to the data portion ALM1–ALM5 and transmitted to the adjacent node in the CCW direction (S503).

When a data signal is received, it is judged whether its destination address coincides with the address of the self node (S601). If the judgment is affirmative, the data signal is entered into the node or the terminal T (S602). If the judgment is negative, the data signal is simply passed through the node concerned (S603).

The above described series of operations including the transmission of a demand signal DMD, the reception of a response signal RSP, and the updating of the table AIT are repeated in each node at the predetermined time intervals. Thus, the alarm information of all the nodes is stored in the alarm information table AIT of each node, and is always updated at the predetermined time intervals. In the above example, since there are five nodes, all of the areas 201–205 of the alarm information table AIT of each node can be filled by two times of information collecting operations, i.e., by repeating two times the series of operations including the transmission of a demand signal DMD (S305), the reception of a response signal RSP, and the updating of the table AIT (S401–S405). In general, in a ring network system having N nodes, the information collecting operation is repeated by the number of times that is equal to a quotient of N/2, because each node collects information from the two adjacent nodes. For example, in a system having 6 or 7 nodes, the information collecting operation is repeated three times. In a system having 8 or 9 nodes, the information collecting operation is repeated four times.

Example of Specific Operation

Referring to FIG. 6, a specific example of the alarm information collecting operation of this embodiment will be described.

Immediately after getting the system up, the nodes NDa–NDe that constitute the ring network system cannot have alarm information other than that of the self node in the respective alarm information tables AITa–AITe. That is, the areas 201, 202, 204 and 205 corresponding to the nodes other than the self node are in a cleared state, i.e., a default state indicated by mark "-" in FIG. 6. Row (1) in FIG. 6 shows states of the respective nodes immediately after the system start-up. Specifically, alarm information ALMa of the node NDa is stored in the central area 203 of the table AITa. Similarly, alarm information ALMb of the node NDb is stored in the area 203 of the table AITb, alarm information ALMc of the node NDc is stored in the area 203 of the table AITc, alarm information ALMd of the node NDd is stored in the area 203 of the table AITd, and alarm information ALMe of the node NDe is stored in the area 203 of the table AITe.

In the following, a description will be made paying attention to the node NDc. A first alarm information collecting operation is performed by sending demand signals DMDc-b and DMDc-d from the node NDc to the adjacent nodes NDb and NDd in the CW and CCW directions, respectively. When receiving the first demand signal DMDc-b from the node NDc, the node NDb sends (or returns) to the node NDc a response signal RSPb-c conveying data of all the areas of the table AITb, i.e., only the alarm information ALMb of the self node at this time.

On the other hand, when receiving the first demand signal DMDc-d from the node NDc, the node NDd sends (or returns) to the node NDc a response signal RSPd-c conveying data of all the areas of the table AITd, i.e., only the alarm information ALMd of the self node at this time. When receiving the response signals RSPb-c and RSPd-c from the respective nodes NDb and NDd, the node NDc stores the alarm information ALMb of the node NDb into the area 202 of the table AITc based on the response signal RSPb-c and also stores the alarm information ALMd of the node NDd into the area 204 based on the response signal RSPd-c. This state is shown in the table AITc in row (2) of FIG. 6.

In the above manner, the node NDc collects alarm information of the adjacent nodes NDb and NDd by accessing those nodes by using the demand signals DMDc-b and DMDc-d. At the same time, the node NDc is accessed by the adjacent nodes NDb and NDd by demand signals DMDb-c and DMDd-c, and sends (or returns) to the respective nodes NDb and NDd response signals RSPc-b and RSPc-d comprising the alarm signal ALMc retained by the self node (at this time, the alarm signals ALMb and ALMd of the respective nodes NDb and NDd are not stored in the table AITc yet).

Further, at the time point of row (2) of FIG. 6, at the same time as the node NDb accesses the node NDc by using the demand signal DMDb-c, the node NDb accesses the node NDa by using a demand signal DMDb-a. Similarly, at the same time as the node NDd accesses the node NDc by using the demand signal DMDd-c, the node NDd accesses the node NDe by using a demand signal DMDd-e. Therefore, as shown in row (2) of FIG. 6, after the first information collecting operation, alarm information is stored in the areas 202, 203 and 204 of the alarm information table AIT of each node.

Further, after a lapse of the predetermined period (several milliseconds), the node NDc performs a second information collecting operation by sending the same demand signals DMDc-b and DMDc-d as in the first operation to the respective nodes NDb and NDd. Response signals RSPb-c and RSPd-c are returned from the respective nodes NDb and NDd in response to the above accessing. The response signals RSPb-c and RSPd-c include the alarm information that was sent at the time of the first information collecting operation shown in row (2) of FIG. 6. Therefore, as shown in row (3) of FIG. 6, after the second information collecting operation, the alarm information ALMa–ALMe of all the nodes are stored in all of the areas 201–205 of the alarm information table AITc of the node NDc. The same thing applies to the alarm tables AIT of the other nodes.

As described above, each node of a ring network can collect alarm information of all the nodes by always accessing the adjacent nodes at predetermined time intervals. As a result, a network control station can recognize alarm states of all the nodes by accessing any node, and can identify a node of fault occurrence immediately.

Since each node can collect alarm information of the two adjacent nodes at one time, the alarm information collecting operation can be performed more than two times faster than in the conventional case where alarm information is collected by circulating a data frame from a supervisory node through a ring network system in a single direction.

That is, the invention does not have the concept of a supervisory node. Rather, every node on the ring network simultaneously accesses the two nodes that are adjacent to it in the CW and CCW directions. Therefore, alarm information of the two adjacent nodes can be collected at one time, and the information collecting operation can be performed more than two times faster than in the case where alarm information is collected by accessing the nodes in a single direction of a ring network. Further, even where a fault occurs in a transmission line between certain nodes, alarm information of all the nodes can be collected by continuing the accessing either clockwise or counterclockwise with the same results as in the case of the accessing in both directions. Thus, influences of a transmission line fault are negligible. Where a fault occurs in both of a higher-rank and a lower-rank transmission lines that are connected to a certain node, alarm information of that node cannot be acquired. However, alarm information of the other nodes can still be obtained, which can minimize influences of such a transmission line fault.

What is claimed is:

1. A method for collecting node information in a ring network comprising a plurality of nodes, the method comprising the steps of:

retaining self-node information in each of the nodes at predetermined time intervals; and accessing two adjacent nodes clockwise and counterclockwise adjacent to each of the nodes to collect node information retained in the two adjacent nodes at the predetermined time intervals so that each of the nodes stores node information of all the nodes.

2. The method according to claim 1, wherein the step of accessing comprises the steps of:

transmitting a demand signal from the node to the two adjacent nodes, the demand signal demanding the node information from the two nodes;

receiving two response signals from the two adjacent nodes, respectively, the two response signals including the node information retained in the two adjacent nodes, respectively; and storing the node information included in the two response signals in each of the nodes.

3. A method for collecting node information in a ring network comprising a plurality of nodes, the method comprising the steps of:

preparing a node information storage provided in each the node, the node information storage having node areas corresponding to the nodes, respectively;

storing self-node information of the node into a certain node area of the node information storage at predetermined time intervals, the certain node area corresponding to the node; and accessing two nodes clockwise and counterclockwise adjacent to the node to store node information stored in node information storage of the two nodes into the node information storage of the node at the predetermined time intervals so that the node information storage of the node stores node information of all the nodes in the node areas, respectively.

4. The method according to claim 3, wherein the step of accessing comprises the steps of:

transmitting a demand signal from the node to the two nodes, the demand signal demanding the node information from the two nodes;

receiving two response signals from the two nodes, respectively, the two response signals including the node information stored in the node information storage of the two nodes, respectively; and storing the node information included in the two response signals into predetermined node areas of the node information storage of the node.

5. The method according to claim 3, wherein the node information storage is divided into the node areas corresponding to the nodes, the node areas being classified into a first segment, a second segment and a third segment, the first segment comprising the certain node area corresponding to the node, the second segment comprising node areas corresponding to nodes which are located clockwise from the node, and the third segment comprising node areas corresponding to nodes which are located counterclockwise from the node.

6. The method according to claim 3, wherein the two nodes comprise a first node clockwise adjacent to the node and a second node counterclockwise adjacent to the node, the step of accessing comprising the steps of:

transmitting a demand signal from the node to the first node and the second node, the demand signal demanding node information stored from the first node and the second node;

receiving a first response signal and a second response signal from the first node and the second node, respectively, the first response signal including the node information stored in the node information storage of the first node, the second response signal including the node information stored in the node information storage of the second node;

reading first node information of the nodes which are located clockwise from the node from the first response signal and second node information of the nodes which are located counterclockwise from the node from the second response signal; and storing the first node information and the second node information into the corresponding node areas of the node information storage of the node.

7. The method according to claim 5, wherein the two nodes comprise a first node clockwise adjacent to the node and a second node counterclockwise adjacent to the node, the step of accessing comprising the steps of:

transmitting a demand signal from the node to the first node and the second node, the demand signal demanding node information stored from the first node and the second node;

receiving a first response signal and a second response signal from the first node and the second node, respectively, the first response signal including the node information stored in the node information storage of the first node, the second response signal including the node information stored in the node information storage of the second node;

reading first node information of the nodes which are located clockwise from the node from the first response signal and second node information of the nodes which are located counterclockwise from the node from the second response signal; and storing the first node information and the second node information into the second segment and the third segment of the node information storage of the node, respectively.

8. A ring network system comprising a plurality of nodes, each of the nodes comprising:

storage means for storing node information of the nodes, the storage means having node areas corresponding to the nodes, respectively;

communication means for communicating with at least two nodes clockwise and counterclockwise adjacent to the node; and control means for controlling the storage means and the communication means such that self-node information of the node is stored into a certain node area of the storage means of the node at predetermined time intervals, the certain node area corresponding to the node; and access to the two nodes is made to store node information stored in the two nodes into the storage means of the node at the predetermined time intervals.

9. The ring network system according to claim 8, wherein the control means controls the communication means such that a demand signal is transmitted from the node to the two nodes, the demand signal demanding the node information from the two nodes; two response signals are received from the two nodes, respectively, the two response signals including the node information stored in the two nodes, respectively; and the node information included in the two response signals are stored into corresponding node areas of the storage means of the node.

10. The ring network system according to claim 8, wherein the storage means is divided into the node areas corresponding to the nodes, the node areas being classified into a first segment, a second segment and a third segment, the first segment comprising the certain node area corresponding to the node, the second segment comprising node areas corresponding to nodes which are located clockwise from the node, and the third segment comprising node areas corresponding to nodes which are located counterclockwise from the node.

11. The ring network system according to claim 8, wherein the two nodes comprise a first node clockwise adjacent to the node and a second node counterclockwise adjacent to the node, the control means controlling the storage means and the communication means such that a demand signal is transmitted from the node to the first node and the second node, the demand signal demanding node information stored from the first node and the second node; a first response signal and a second response signal are received from the first node and the second node, respectively, the first response signal including the node information stored in the first node, the second response signal including the node information stored in the second node; first node information of the nodes which are located clockwise from the node is read out from the first response signal and second node information of the nodes which are located counterclockwise from the node is read out from the second response signal; and the first node information and the second node information are stored into the corresponding node areas of the storage means of the node.

12. The ring network system according to claim 10, wherein the two nodes comprise a first node clockwise adjacent to the node and a second node counterclockwise adjacent to the node, the control means controlling the storage means and the communication means such that a demand signal is transmitted from the node to the first node and the second node, the demand signal demanding node information stored from the first node and the second node; a first response signal and a second response signal are received from the first node and the second node, respectively, the first response signal including the node information stored in the first node, the second response signal including the node information stored in the second node; first node information of the nodes which are located clockwise from the node is read out from the first response signal and second node information of the nodes which are located counterclockwise from the node is read out from the second response signal; and the first node information and the second node information are stored into the second segment and the third segment of the node information storage of the node, respectively.

\* \* \* \* \*